United States Patent [19]

Matsuura et al.

[11] Patent Number: 5,209,618
[45] Date of Patent: May 11, 1993

[54] METHOD OF SETTING TRACING ZONE

[75] Inventors: Hitoshi Matsuura, Hachioji; Tetsuji Okamoto, Minamitsuru, both of Japan

[73] Assignee: Fanuc Ltd., Minamitsuru, Japan

[21] Appl. No.: 773,867

[22] PCT Filed: Feb. 22, 1991

[86] PCT No.: PCT/JP91/00235
§ 371 Date: Oct. 25, 1991
§ 102(e) Date: Oct. 25, 1991

[87] PCT Pub. No.: WO91/12928
PCT Pub. Date: Sep. 5, 1991

[30] Foreign Application Priority Data

Mar. 2, 1990 [JP] Japan .................................. 2-51440

[51] Int. Cl.$^5$ ............................................. B23Q 35/12
[52] U.S. Cl. .................................... 409/84; 318/578; 364/474.03; 409/127; 409/132
[58] Field of Search ................ 409/84, 127, 125, 126, 409/131, 132; 364/474.03, 474.37; 318/578

[56] References Cited

U.S. PATENT DOCUMENTS

| | | | |
|---|---|---|---|
| 4,456,962 | 6/1984 | Imazeki et al. | 318/578 |
| 4,467,432 | 8/1984 | Imazeki et al. | 318/578 |
| 4,472,782 | 9/1984 | Suzuki | 364/167 |

FOREIGN PATENT DOCUMENTS

| | | | |
|---|---|---|---|
| 34006 | 8/1981 | European Pat. Off. | 409/127 |
| 62448 | 4/1985 | Japan | 409/84 |
| 688297 | 10/1979 | U.S.S.R. | 409/132 |

*Primary Examiner*—Daniel W. Howell
*Attorney, Agent, or Firm*—Staas & Halsey

[57] ABSTRACT

A method of setting a tracing zone in a contour tracing in which a surface of a model is traced by a contour tracing to thereby machine a workpiece. The contour tracing zone is set by a plurality of straight lines forming a polygonal shape (43, 44, 45), and when a stylus (5) reaches the straight lines forming a polygonal shape line (43, 44), pick feed is carried out to thus machine the workpiece by a contour machining. Because a tracing zone in the contour tracing is set by a plurality of straight lines forming a polygonal shape (43, 44, 45), the necessary contour tracing zones can be precisely set and therefore, unnecessary machining time is eliminated and life and so on of tools is prolonged.

3 Claims, 2 Drawing Sheets

METHOD OF SETTING TRACING ZONE

BACKGROUND OF THE INVENTION

1. Field of the Invention

The present invention relates to a method of setting a tracing zone in a contour tracing in which a surface of a model is traced by tracing a contour thereof so as to machine a workpiece, and more particularly, to a method of setting a tracing zone in which the tracing zone is set by using a plurality of folded lines.

2. Description of the Related

Tracing machining in which a model is traced so as to machine a workpiece is widely used, as the workpiece can be machined without preparing a machining program of the model. Particularly, contour tracing is useful because a free curved surface, which can not be enciphered, can be easily machined thereby.

Not all of the surfaces of the model are needed for general tracing, only zones which are a part thereof as effective curved surfaces. Therefore, usually a zone for the contour tracing is set for the machining.

Contour tracing zones, however, are usually set by straight lines in parallel to the X-axis or the Y-axis, and thus, unless the contour tracing zone is within a rectangle on the X-Y plane, unnecessary zones are machined by the contour tracing, which results in a prolonged machining time and a reduced life of the tools.

SUMMARY OF THE INVENTION

The present invention has been made in view of the aforesaid drawbacks. Therefore, an object of the present invention is to provide a method of setting a tracing zone in a contour tracing, in which the tracing zone is set by using a plurality of limit lines which are not parallel to the axes.

To achieve the above object, in accordance with the present invention, there is provided a method of setting a tracing zone in a contour tracing in which a surface of a model is traced by a contour tracing to thus machine a workpiece, this method comprising setting a contour tracing zone by using a plurality of limit lines which are not parallel to the axes, carrying out a pick feed when a stylus reaches the limit lines, and machining the workpiece by a contour tracing.

Because a tracing zone in the contour tracing is set by using a plurality of limit lines which are not parallel to the axes, the necessary contour tracing zones can be precisely set, and therefore, unnecessary machining time is eliminated and the life, etc. of tools can be prolonged.

DESCRIPTION OF THE PREFERRED EMBODIMENT

An embodiment of the present invention will be hereinafter described with reference to the drawings.

Figure 1:
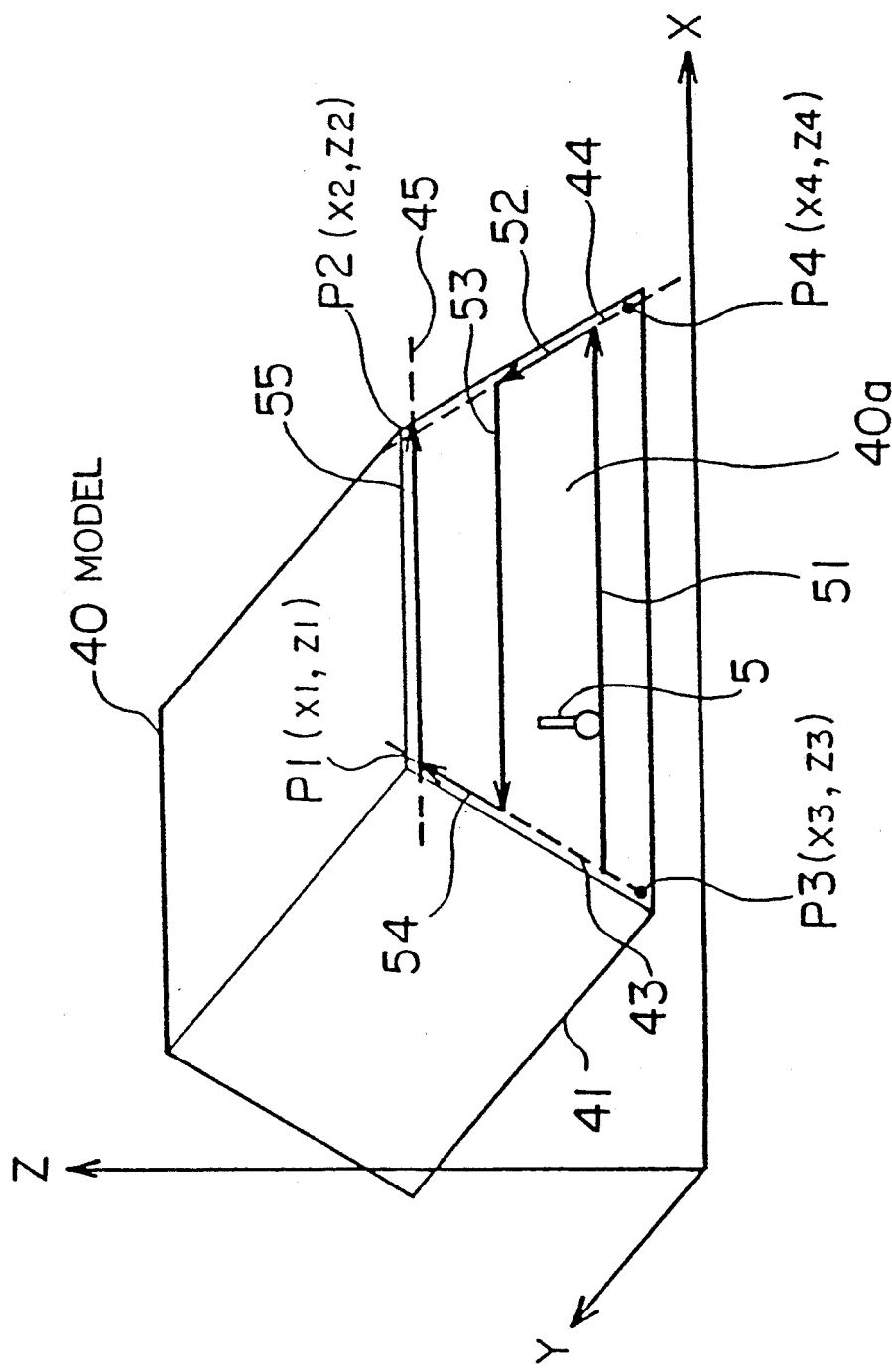
FIG. 1 is a diagram explaining the outline of a method of setting a tracing zone according to the present invention.

FIG. 1 is a diagram explaining the outline of a method of setting a tracing zone according to the present invention. As shown in FIG. 1, a model 40 has a rectangular bottom surface and an upper surface in the shape of a rectangle smaller than that of the bottom surface. Note, it is assumed that a front surface 40a is to be traced by a contour tracing. To carry out a contour tracing of this surface 40a, when a line in parallel to the Y-axis, for example, a ridge line 41 of the bottom surface, is chosen as a limit line, there is no unnecessary contour tracing of the lower part, but unnecessary zones will be contour-traced in the part above that.

In the present invention, a contour tracing zone is set by a broken line 43 and a broken line 44. The broken line 43 is designated by a point P1 (x1, z1) and a point P3 (x3, z3). Namely, a tracing control system produces the broken line 43 as a first limit line by designating the point P1 and the point P3. Similarly, the broken line 44 is designated by a point P2 (x2, z2) and a point P4 (x4, z4), and the tracing control system produces a second limit line accordingly. Also, a broken line 45 is set by the tracing control system as a third limit line, by designating a coordinate value z1 of the Z-axis, where $z2 \leq z1$.

A stylus 5 carries out a contour tracing along a line 51, and when the stylus 5 reaches the broken line 44, a pick feed operation is carried out along a line 52 on the broken line 44, and then the contour tracing is carried out in the opposite direction along a line 53. When the stylus 5 reaches a first limit line, i.e., the broken line 43, a pick feed operation is carried out along a line 54, and then the contour tracing is continued along a line 55. When the stylus 5 reaches the second limit line, i.e., the broken line 44, the contour tracing is ended, since the coordinate of the Z-axis has already reached the third limit line 45.

Thus, the necessary contour tracing zones can be precisely set, because the contour tracing zones are set by using a plurality of straight lines, and further, the machining time can be reduced. Also, although the lines used for setting the contour tracing zones are straight lines in the above explanation, they can be angled lines having a plurality of crossover points.

Figure 2:
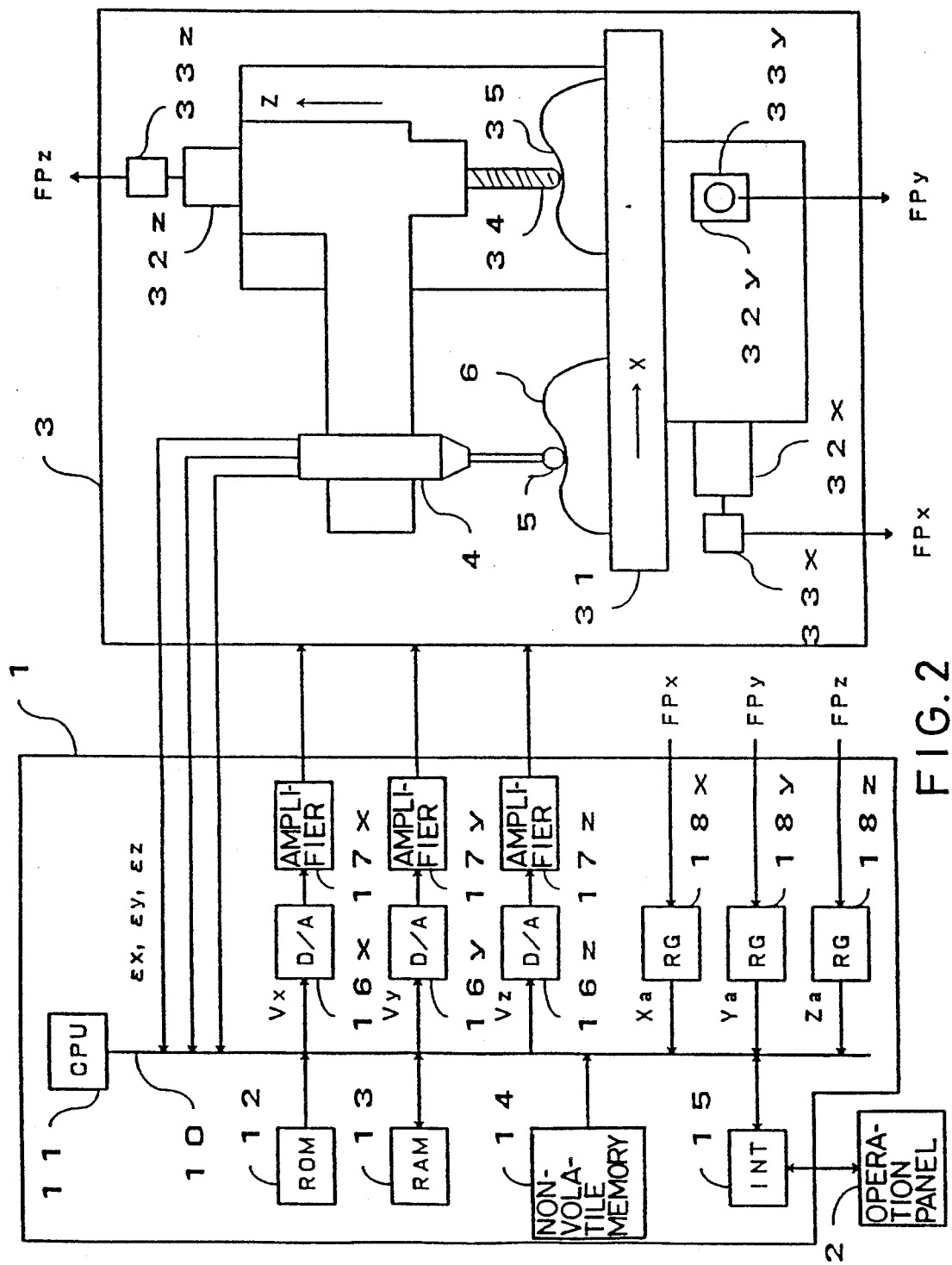
FIG. 2 is a block diagram showing a constitution of a tracing control system for carrying out the present invention.

FIG. 2 is a block diagram showing a constitution of a tracing control system for carrying out the present invention. In this FIG., a processor 11 reads a system program stored in a ROM 12 through a bus 10, and controls an overall operation of a tracing control system 1 according to this system program. A RAM 13 stores temporary data, and a nonvolatile memory 14, backed up by a battery not shown, stores various parameters such as a limit line, a tracing direction, tracing speed and so on input from a control panel 2 through an interface 15.

A tracer head 4 provided at a tracing machine tool 3 detects each of displacement amounts $\epsilon x$, $\epsilon y$ and $\epsilon z$ in the X-, Y- and Z-axis directions generated when the tip end of the stylus 5 is brought into contact with a model 6, carries out a digital conversion thereof, inputs them to the processor 11.

The processor 11 generates a speed command Vx of the X-axis, a speed command Vy of the Y-axis and a speed command Vz of the Z-axis, based on the displacement amounts $\epsilon x$, $\epsilon y$ and $\epsilon z$, and outputs tracing directions and tracing speed commands according to a known process. The speed commands are analog converted at D/A converters 16x, 16y and 16z and input to servo amplifiers 17x, 17y and 17z, the outputs of which drive servo motors 32x, 32y and 32z of the tracing machine tool 3.

Thus, the tracer head 4 is moved in the Z-axis direction so that the relationship among the relative positions of the tracer head 4 and the model 6 is kept constant, a table 31 is moved in the Y-axis direction at right angles to the X-axis and the paper surface, and a workpiece 35 is machined to a shape which is the same as that of the model 6, by a cutter 34 controlled by the Z-axis, as with the tracer head 4.

Also, the servo motors 32x, 32y and 32z, are provided with pulse coders 33x, 33y and 33z, for generating detection pulses FPx, FPy and FPz per predetermined amount of rotation thereof. Present position registers 18x, 18y and 18z in the tracing control system 1 count up/down the detection pulses FPx, FPy and FPz according to the rotation direction, respectively, to thereby to acquire present position data Xa, Ya and Za of the tracer head 4, and this position data is read by the processor 11.

With the present invention, as described above, because the tracing zone in the contour tracing is set by using a plurality of straight lines, the contour tracing zone can be precisely set and the tracing machining time for the contour tracing can be shortened.

What is claimed is:

1. A method of setting a tracing zone in a contour tracing in which a surface of a model is traced by a contour tracing to thereby machine a workpiece, comprising:
    (a) setting a contour tracing zone using a plurality of straight lines forming a nonrectangular polygonal shape, at least one of said straight lines defined by designating coordinate values of end points of two other of said straight lines;
    (b) performing contour tracing with a pick feed each time a stylus reaches one of said straight lines forming the polygonal shape; and
    (c) machining the workpiece in dependence upon the contour tracing performed in step (b).

2. A method of setting a tracing zone according to claim 1, wherein at least one of said straight lines is defined by designating three-dimensional coordinate values.

3. A method of setting a tracing zone according to claim 1, wherein said setting in step (a) uses coordinates that include an axis along which a stylus is deflected during said performing of contour tracing in step (b).

* * * * *